United States Patent [19]

Brocker et al.

[11] 3,766,523

[45] Oct. 16, 1973

[54] SEQUENTIAL TONE SIGNALLING SYSTEM

[75] Inventors: John R. Brocker, Batavia; Ronald H. Chapman, Wheaton; Paul Jacobs, Schaumburg; Ronald C. Johnson, Chicago; Jerry R. Powell, Carol Stream, all of Ill.; Robert L. Peay, Coral Spring, Fla.

[73] Assignee: Motorola, Inc., Franklin Park, Ill.

[22] Filed: Oct. 4, 1972

[21] Appl. No.: 295,074

[52] U.S. Cl. .............................. 340/171 PF, 325/64

[51] Int. Cl. .......................... H04b 1/00, H04q 1/45

[58] Field of Search .................. 340/171 R, 171 PF

[56] References Cited

UNITED STATES PATENTS

| | | | |
|---|---|---|---|
| 3,472,965 | 10/1969 | Blossom | 340/171 R X |
| 3,506,966 | 4/1970 | Magnuski | 340/171 R |
| 3,670,242 | 6/1972 | McGarvey | 340/171 PF |

*Primary Examiner*—Donald J. Yusko
*Attorney*—Vincent J. Rauner

[57] ABSTRACT

A selective calling sequential tone signalling system for transmitting and receiving predetermined coded messages. A base station and at least one mobile station is provided, and message, status, automatic status and identification codes comprising predetermined format sequences having seven tones each are transmitted therebetween. Automatic message acknowledgment is provided for message receipt verification, and apparatus is provided for substantially eliminating false reception of signals having an improper format.

25 Claims, 5 Drawing Figures

SEQUENTIAL TONE SIGNALLING SYSTEM

BACKGROUND

1. FIELD OF INVENTION

This invention relates generally to signalling systems, and more particularly to selective calling tone sequential signalling systems for transmitting predetermined messages from one point to another.

2. PRIOR ART

There are many applications wherein it is necessary to provide a signalling system for transmitting predetermined messages or status reports. One such application for such a signalling system is in a centrally dispatched mobile fleet, such as a taxi or trucking fleet.

Several systems for signalling a remote vehicle are known. One such system uses voice communication, while another system utilizes a remotely controlled printer in the vehicle to provide a printed copy of the message.

Whereas these techniques provide a way to achieve signalling between a base station and a vehicle, the transmission of voice is becoming increasingly inefficient due to the large number of users of present two way radio channels. In addition, if the mobile operator is not in his vehicle when a message is received, the message is missed. A printer system provides a hard copy of any message received when the operator is away from his station, but a printer system is relatively expensive and is inherently a low speed device. In addition, the systems according to the prior art do not provide means for monitoring the status of the vehicle without operator attention.

SUMMARY

It is an object of the present invention to provide an improved signalling system for a centrally dispatched fleet of remote vehicles.

It is a further object of this invention to provide a relatively high speed tone sequential signalling system for transmitting predetermined messages between two stations.

It is another object of this invention to provide a signalling system that can receive messages while unattended for future notice by the operator.

It is yet another object of this invention to provide a signalling system that can selectively transmit messages to one or several predetermined receiving stations.

It is another object of this invention to provide a system that automatically monitors the status of a remote station.

A still further object of this invention is to provide a signalling system that automatically monitors the radio channel for signals thereon and stores messages for transmission only when the channel is clear.

Still another object of the invention is to provide a signalling system having automatic identification of a transmitting station, and automatic acknowledgment of the receipt of a message by retransmission of the message from the receiving station to the message originating station.

In accordance with a preferred embodiment of the invention; seven tone sequential messages are transmitted between stations. Three of the tones represent address numbers for selectively calling and identifying a particular station. Two of the tones represent data information, which may be message or status information. One of the remaining tones separates the data portion from the address portion of the signal, and the remaining tone, along with the separation tone, provides protection from false triggering of the system by extraneous signals. The tone sequence has further constraints placed on it, such as the length of each tone in the sequence and the exclusion of repeated tones. The latter is accomplished through the use of a special repeat tone, which also serves as the separation tone between the data and address portions of the message.

The base station portion of the system utilizes a programmable variable frequency tone oscillator for generating the tone sequences. Messages received by the base station are decoded by a matrix of eleven fixed frequency filters and decoding logic associated with the filters. A variable frequency programmable filter is employed to reduce false triggering caused by long duration extraneous tones. Storage means is provided for storing received messages for retransmission to the originating station to provide acknowledgment.

The mobile station utilizes a programmable variable frequency oscillator for tone generation, and a single programmable variable frequency tone filter for receipt of pre-programmed message sequences. Apparatus is provided for dissipating the energy stored in the filter between tones in a sequence to allow the frequency of the variable programmable filter to be rapidly changed, thereby allowing relatively high speed tone sequences to be decoded.

DETAILED DESCRIPTION

Figure 1:
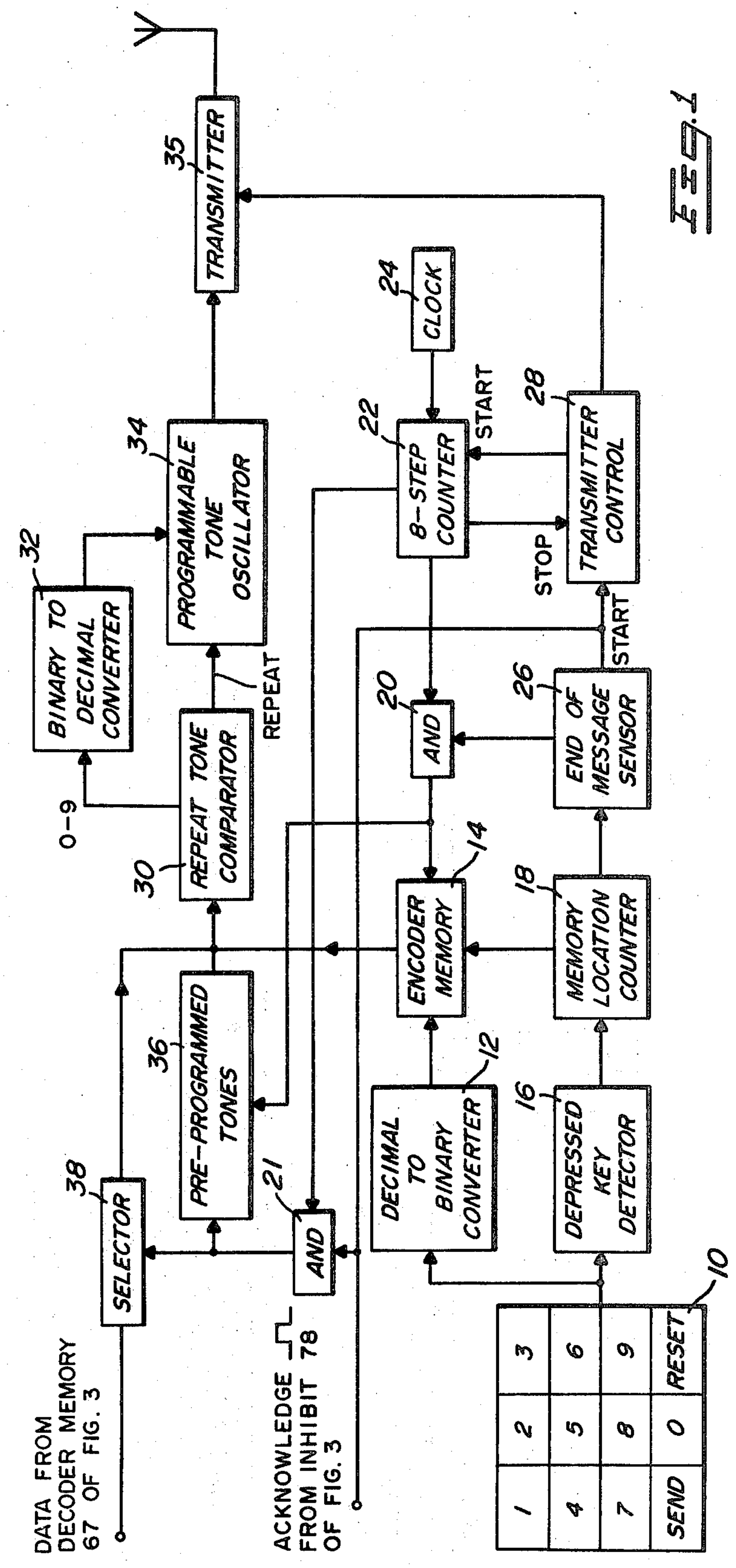
FIG. 1 is a block diagram of the encoding circuitry used in a base station employing the signalling system according to the invention.

Referring to FIG. 1, there is shown a block diagram of the encoder portion of a base station of the signalling system according to the invention. A data entry means, in this embodiment a keyboard 10, is connected to an encoder memory 14 or other storage means through a decimal to binary converter 12. The keyboard 10 and converter 12 provide programming means for the memory 14. A depressed key detector 16 connected to the keyboard 10 is connected to a memory location counter 18 which controls the location in the memory 14 in which the data from the keyboard 10 is stored. The memory 14 is controlled by a clock 24 coupled thereto through an eight step counter 22 and an AND circuit 20. An end of message sensor 26 is connected to the memory location counter 18, the AND circuit 20 and a transmitter control circuit 28 connected to a transmitter 35.

The output of the encoder memory 14 is connected to a repeat tone comparator 30 which inserts a repeat tone when the information in the encoder memory calls for two successive tones having the same frequency. A programmable tone oscillator 34 or other tone generating means is connected to the transmitter 35 and to the repeat tone comparator 30 through a binary to decimal converter 32 and is controlled by signals from the encoder memory 14. The programmable tone oscillator 34 is also controllable by a pre-programmed tone program 36 which is connected to the repeat tone comparator 30, and by data from a memory 67 of the decoder portion of the base station (shown in FIG. 3), which is also connected to the repeat tone comparator 30 by means of a selector 38. The pre-programmed tone program 36 is controlled by the AND circuit 20 connected thereto and by another AND circuit 21 connected to the program 36, the selector 38, the eight step counter 22 and the inhibit circuit 78 of FIG. 3.

In order to better understand the operation of the system, the format of the signalling tones will be explained. The format of the tones is shown graphically in FIG. 2. The message comprises a sequence of tones 51 through 57. Each of the tones has a time duration of 40 milliseconds, in this embodiment, and can have one of eleven frequencies. Ten of the frequencies represent decimal information digits, in this embodiment, the numerals 0 through 9, and the eleventh frequency is the repeat, or separation, tone whose function will be explained subsequently in this application. Each of the individual tones will be hereinafter referred to by the number which it represents, for example, the tone representing the numeral 6 will be referred to as a 6 tone, or simply 6, and the tone representing the repeat function will be referred to as the repeat tone, or simply repeat.

Figure 2:
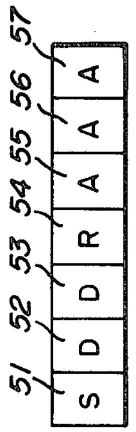
FIG. 2 is a graphical representation of a tone sequence generated by the signalling system according to the invention.

In the format shown in FIG. 2, the first tone in the sequence 51 is a system tone which alerts a particular system that a message is forthcoming. Following the system tone, two data tones 52 and 53 are sent. The data tones represent a particular message or command to be sent. Following the data tones, a repeat tone 54 is sent, followed by three address tones 55, 56 and 57. The three address tones contain an identification sequence for a particular mobile receiver and enable the base station to selectively call any particular mobile.

A further constraint on the format of the tone sequence shown in FIG. 2 is that two successive tones having the same frequency cannot be transmitted in sequence. This constraint is necessary to prevent false triggering of the system by an interfering tone or voice tranmission. For example, if the system were not so constrained, a continuous tone having a frequency representative of, for example, the numeral 9, would be decoded by the system as a message consisting of seven 9's. The eleventh tone, or repeat tone, eliminates the continuous tone falsing problem. When it is desired to transmit a sequence of like numbers such as, for example, (9,9,9), the sequence (9,R,9) is transmitted instead, where R means the repeat tone. The system is constructed to be responsive only to sequences such as (9,R,9) and not to sequences such as (9,9,9) to prevent the aforementioned falsing by continuous tones.

In the system of the present embodiment, the first tone, or system tone 51, can be any one of the tones 0 through 6. Because the second tone 52 cannot be the same tone as the first tone 51, it is constrained to the values of 7, 8 or 9. The second tone is constrained to these values for the purposes of circuit simplicity. If a wider range of tones is desired for tones 51 and 52, logic circuitry can be employed to insert a repeat tone in position 52 when the first and second tones would otherwise be identical. The third tone 53 is also a data representative tone and can be any tone provided that it is not identical to the tone 52. The fourth tone 54 is always the repeat tone, in this embodiment, and serves to separate the last data tone 53 from the first address tone 55, thereby allowing the tone 55 to be any frequency regardless of the frequency of the tone 53. If a shorter tone sequence is desired, the repeat tone 54 can be omitted, but logic circuitry must be employed to insert a repeat tone in position 55 in instances where the frequency of tone 53 and 55 would otherwise be identical. The last two address tones 56 and 57 can take any value, and logic circuitry is provided to insert a repeat tone where necessary. Since each of the tones can be any one of ten frequency values, up to 999 distinct mobiles can be addressed within each system.

In operation, the message to be transmitted is entered into the system by depressing the appropriate pushbuttons on keyboard 10. The data thus entered consists of the address of the mobile being called or other desired information. The entered data is stored in the encoder memory 14 in locations determined by the order in which the keys were pressed, the locations being determined by the depressed key detector 16 and the memory location counter 18. In this embodiment, the system tone 51 is pre-programmed in the pre-programmed tone memory 36. After the message has been completely entered, the end of message sensor 26 receives a signal from the memory location counter 18 indicating that the encoder memory 14 has been completely filled and causes the programmed tones from memories 36 and 14 to be sequentially applied to the repeat tone comparator 30 under the control of the AND gate 20 which is controlled by the eight step counter 22. The repeat tone comparator 30 inserts the repeat tone as necessary to prevent successive transmissions of identical tones and applies signals representative of the tones 0 through 9 to the binary to decimal converter 32 which provides signals to the programmable tone oscillator 34 to vary the frequency thereof in accordance with the sequence of signals stored in memories 36 and 14. The end of message sensor 26 also enables the transmitter 35 to be energized or keyed via transmitter control 28, which also starts the eight step counter 22. After transmission, the eight step counter 22 provides a signal to the transmitter control 28 to terminate the transmission after the tone sequence has been sent. When signals that have been received by the base station are being acknowledged, the tone sequence is applied to the transmitter from the preprogrammed tone program 36 and from a decoder (described in the following paragraphs) via a selector 38. The program 36 and the selector 38 are controlled by the decoder and the eight step counter 22 by means of the AND gate 21.

Figure 3:
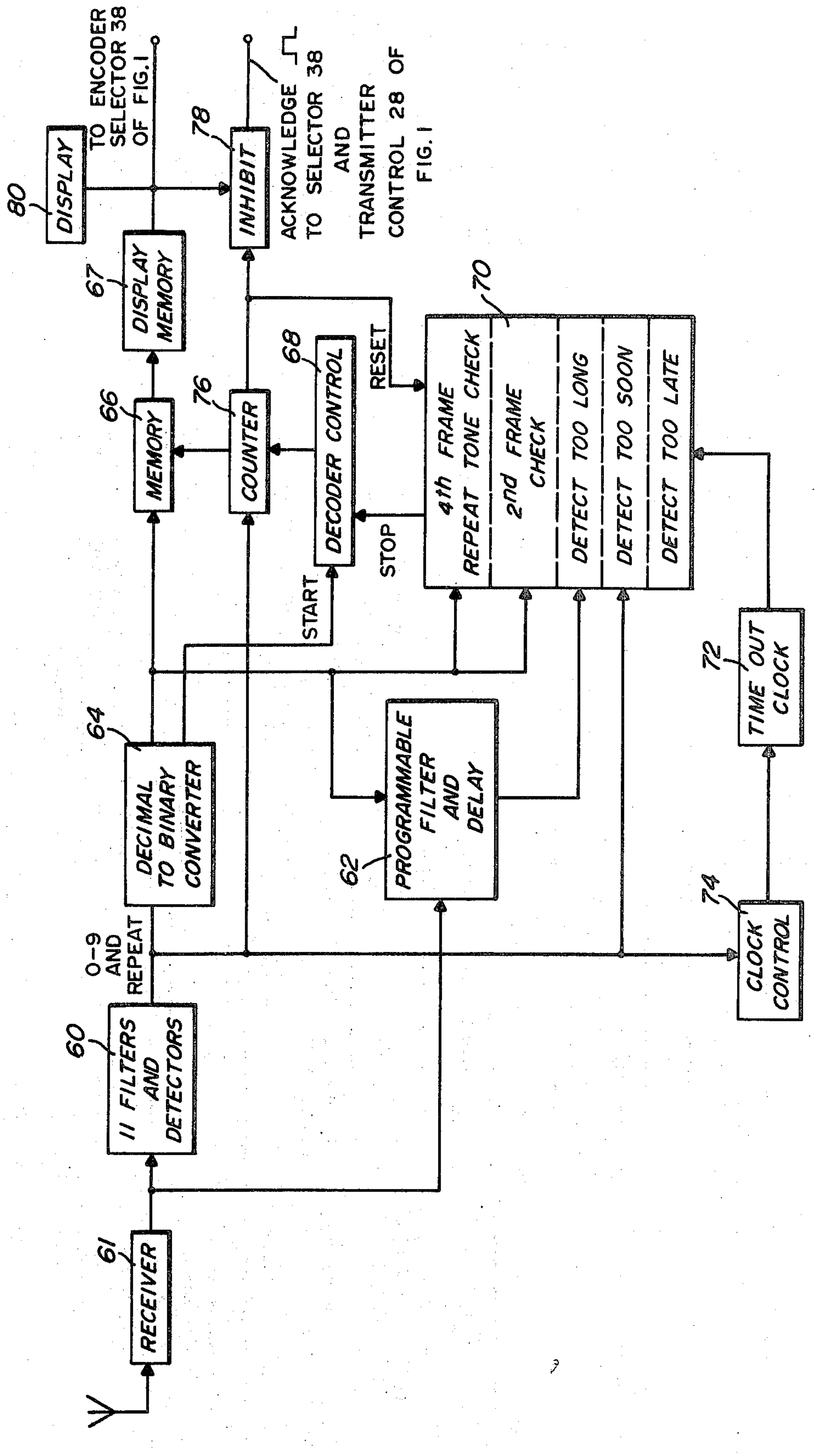
FIG. 3 is a block diagram of the decoding system utilized in a base station.

Referring to FIG. 3, there is shown a block diagram of the decoder portion of the base station. A bank of eleven filters and detectors 60 is connected to a source of tone signals such as a telephone line or a radio receiver 61. A programmable filter 62 is also connected to the receiver 61. A decimal to binary converter 64, or other decoding means, is connected to a programmable filter 62, the memory 66, or other storage means, a decoder control 68 and a false triggering inhibiting circuit 70. Although the encoder memory 14 and memory 66 are shown as separate blocks, a single storage means may be used if desired. A time out clock 72 is also connected to the false triggering inhibiting circuit 70 and to a clock control 74, which is also connected to the filter bank 60. A counter 76 is connected to the memory 66 and the decoder control 68. An inhibit circuit 78 is also connected to the memory 66 and the counter 76. The output of the memory 66 is also connected to the selector 38 in the encoder of FIG. 1, and to a display panel 80, which may be any type of visual or audible readout device, through a display memory 67. The output of the inhibit circuit 78 is connected to the selector 38 and the transmitter control 28 of the encoder of FIG. 1 to control the acknowledgment function of the encoder.

In operation, a sequence of tones is received from the mobile station by means of the base receiver 61 in this embodiment, and applied to the filter bank 60 and the programmable filter 62. Each of the filters in the filter bank 60 is tuned to one of the frequencies representing the numerals 0 through 9, one of which is a system tone, and the repeat tone. If the received signal frequency is substantially equal to one of the filter frequencies, the filter bank 60 provides an output signal to the decimal to binary converter 64 representative of the frequency of the received tone. The decimal to binary converter 64 converts the signal from the filter bank 60 binary form and applies the binary signal to the memory 66 for storage thereof, and to the programmable filter 62 to cause the frequency of the programmable filter 62 to be substantially equal to the frequency of the last tone received. The binary signal from the converter 64 is also applied to the decoder control 68 to start the decoding process when the proper system tone 51, which is normally the first tone in a sequence, is received. When the system tone is received, the decoder control 68 applies a signal to the counter 76 to make the counter responsive to detected signals from filter bank 60 and to provide stepping signals to memory 66 for proper storage of the signal from converter 64. The output signal from the converter 64 is also applied to the false triggering inhibit circuit 70 to determine whether the tone sent in the fourth frame is the required repeat tone, and whether the tone sent in the second frame is a 7, 8 or 9 as required by the format of the signalling used in this embodiment. If either condition is not met, the decoding process is terminated at the end of the second or fourth frame.

The programmable filter 62 is tuned to the frequency of the tone most recently received, and passes a defeat signal to the inhibit circuit 70 if a particular frequency tone signal has been present too long. The response time, or delay of the programmable filter 62 is adjusted such that the programmable filter 62 provides no output signal if the time duration of the received tone is proper, but a signal is provided to the inhibit circuit 70 to terminate the decoding if the duration of the received tone exceeds a predetermined time interval.

The output from the filter bank 60 is also applied to the inhibit circuit to determine whether another tone has been detected too soon. Since the time duration of each tone in a proper sequence is constrained, and since the response time of the filter bank is also fixed, any premature change in frequency is indicative of an extraneous signal, and decoding is terminated upon receipt of a frequency change that occurs too soon. Similarly the clock control 74 and the time out clock 72 provide a control signal to the inhibit circuit 70 if the detection of a new tone does not occur more than a predetermined time interval after the detection of a previous tone.

After a proper seven tone sequence has been received, it is stored in the memory 66. The memory 66 then transfers the information stored therein to the display memory 67 which provides an output signal to the display 80 to cause display 80 to indicate which message has been received. The function of the display memory 67 is to prevent false detections from affecting the display. The memory 67 may be eliminated and the display 80 connected to the memory 66 if falsing is not a problem. Simultaneously the message is applied to the selector 38 of the encoder of FIG. 1 which passes the message to the transmitter 35 for retransmission to the originating station for verification purposes. The counter 76 also provides a reset signal to the inhibit circuit 70 to reset it for the next received signal, and an acknowledgment signal pulse to the transmitter control 28 to turn on the transmitter 35, and to selector 38 of the encoder of FIG. 1 to cause the received message to be selected for retransmission. In certain cases it is desired not to acknowledge the receipt of a message, and the memory 67 provides a signal to the inhibit circuit 78 to prevent acknowledgment of these messages.

Figure 4:
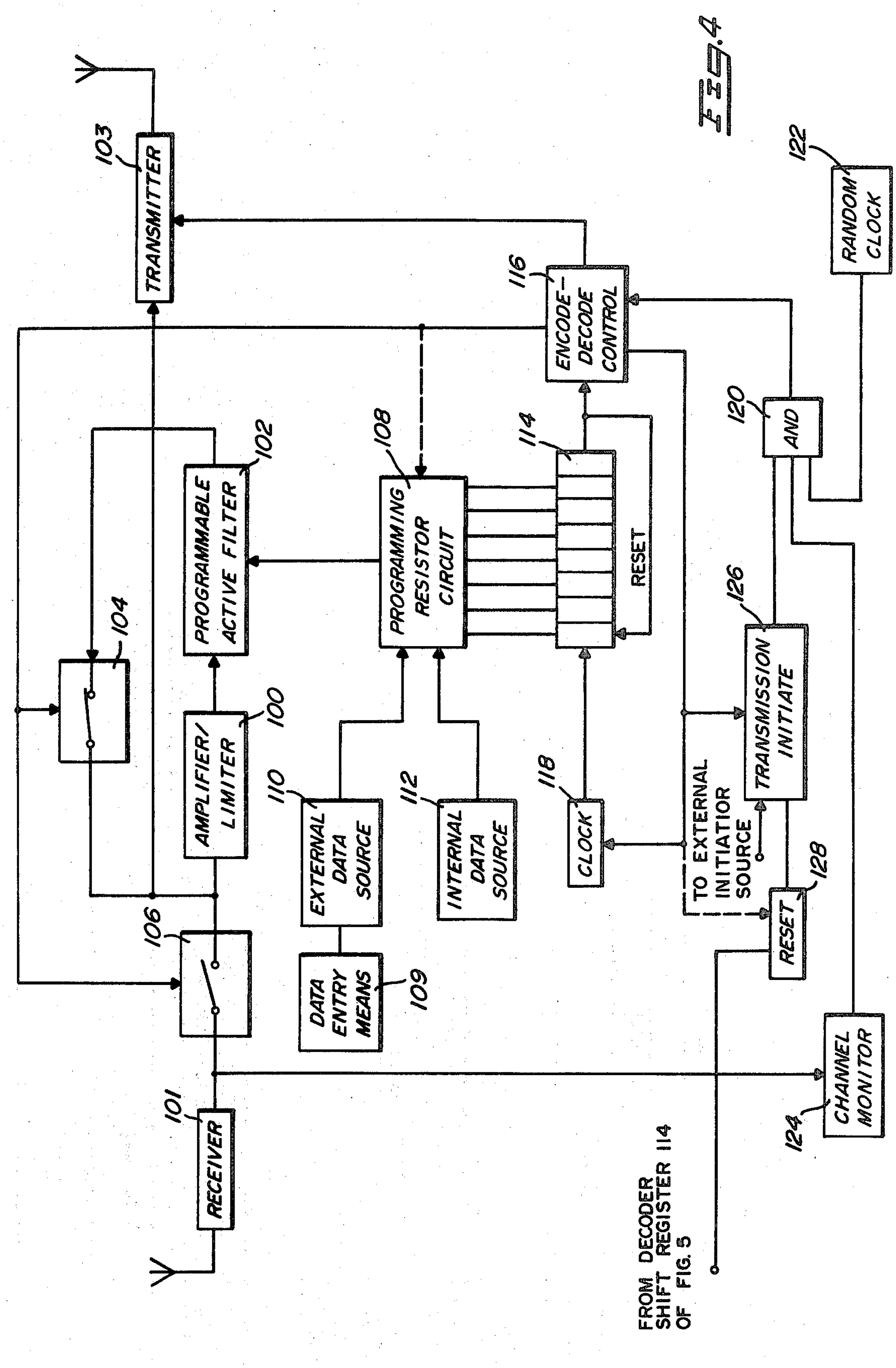
FIG. 4 is a block diagram of apparatus used in a mobile station connected for operation as an encoder.

The mobile station utilizes a single programmable active filter to provide both the encoding and decoding functions. In addition, much of the logic circuitry for controlling the active filter is used to provide both the encoding and decoding functions. The circuitry common to the encoding and decoding systems is shown having the same reference number in FIGS. 4 and 5. Referring to FIG. 4, there is shown a block diagram of the mobile station circuitry connected to provide the encoding function. An output terminal of an amplifier/limiter 100 is connected to an input terminal of a programmable active filter 102 which also has an output terminal connected to an input terminal of the amplifier/limiter 100 through feedback means, in this embodiment, a switch 104, thereby providing a feedback loop to cause the system to oscillate at a frequency determined by the frequency of the active filter 102. The active filter 102 provides a variable frequency filter means in this embodiment, however any suitable filter may be used. Although the switch 104 is shown schematically as a mechanical switch, any mechanical, electronic or other switch that reduces the loop gain, when opened, to a level insufficient to sustain oscillation may be used and still fall within the scope of the invention. A second switch 106 is also connected to the input of the amplifier/limiter 100 and to a mobile receiver 101 or other source of tone signals. In the encoding mode, the switch 104 is closed to complete the feedback loop, and the switch 106 is open to block signals from the receiver 101. Switches 104 and 106 form a function selector means in this embodiment, however, the function selection can be provided by other means, including another switch interposed between filter 102 and detector 130 of FIG. 5.

The matrix of programming resistors 108, which includes switching and logic circuits to switch appropriate resistors into the active filter 102, is connected to the programmable active filter 102, an external data source 110, an internal data source 112 and a shift register 114. The resistors 108 and the data sources 110 and 112 form a filter program means for filter 102. The internal data source 112 includes a preprogrammed memory, while the external data source 110 includes a programmable memory, and has data entry means 109 such as a pushbutton, connected thereto for changing the data programmed therein. The internal data source 112 includes internally programmed data that is normally not accessible to the operator, whereas the external data source 110 includes data that can be changed by the operator and by data from remote sensors by means of the data entry means 109 connected to the external data source 110. The output of the shift register 114 is connected to an encode-decode control 116, which is connected to switches 104 and 106 and to a transmitter 103 for control thereof. The shift register 114 is controlled by a clock 118 connected thereto. An output terminal of an AND gate 120 is connected to the encode-decode control 116, and the input terminals of the AND gate 120 are connected to a random clock 122, a channel monitoring circuit 124 and a transmission initiation circuit 126. The channel monitoring circuit 124 is also connected to the receiver or other tone signal source, and the transmission initiation circuit 126 is connected through the encode-decode control 116 to the shift register 114. In the decode mode, the register 114 is also connected to a reset circuit 128 for resetting the transmission initiation circuit 126. The output of the programmable active filter 102 is connected to the transmitter 103 for transmission of the tones generated thereby when operating in the encoding mode.

In operation, the closed loop comprising the amplifier/limiter 100, the programmable active filter 102 and the switch 104 oscillates to provide tone signals to the transmitter 103 for transmission. The frequency of oscillation is controlled by the frequency of the programmable active filter 102, which is in turn controlled by the matrix of programming resistors 108. Various programming resistors for changing the frequency of the active filter 102 are sequentially switched into the circuit by the resistor circuit 108 under the control of the shift register 114. The particular values of resistors switched in by the resistor circuit 108 are determined by the data sources 110 and 112 which provide data entry means. The internal data source determines the resistors that correspond to the tones associated with a particular mobile, such as the address tones, in some systems, the repeat tone separating the address tones from the data tones, and in some instances a system tone. The external data source 110 may include a variety of input circuits, including a keyboard or pushbuttons for entering particular messages and sensors for sensing the status of a particular point on a vehicle, such as, for example, the presence of a passenger in a taxicab.

After the programming resistor matrix 108 has been preprogrammed by the internal and external data sources 110 and 112, respectively, the programming resistors are sequentially switched by the shift register 114 under the control of the clock 118 to vary the frequency of oscillation of the loop, thereby providing a tone sequence to the transmitter. After all of the appropriate resistors have been sequentially connected to the active filter 102, the shift register 114 provides a signal to the encode-decode control 116 to cause the control 116 to de-energize the transmitter 103 and to open the switch 104, thereby opening the loop and preventing further oscillation after the tone sequence has been transmitted.

The transmission of the tone sequence is initiated and controlled by the circuitry including the AND gate 120, the random clock 122, the channel monitor 124, the transmission initiate circuit 126 and the reset circuit 128. When the transmission is initially initiated by an external initiation source such as a pushbutton (not shown) on a control panel, the transmission initiation circuit 126 provides a signal to the AND gate 120. The signal from the transmission initiation circuit 126 can also be made to occur when new data is applied to the programming resistor matrix from one of the data sources. The channel monitor 124 provides a signal to the AND gate 120 when no signal is present on the transmission channel. The random clock 122 provides signals to the AND gate 120 at random intervals, such as, for example, approximately every five seconds. The AND gate 120 provides an output signal to the encode-decode control 116 to initiate the encoding and transmission cycle only when there is a signal applied to all three of its inputs. The encode-decode control 116 initiates the clock 118 and adjusts its period for the encoding mode.

After new data has been applied to the system, the transmission initiation circuit 126 applies a signal to the AND gate 120. If the transmission channel is clear, the channel monitor 124 also applies a signal to the AND gate 120. Since two signals are now present at the input of the AND gate 120, the system will automatically sequence and transmit the programmed message upon receipt of the next clock signal from the random clock 122. Although the function of the random clock 122 is not readily apparent, its function will become clear in the following example.

If the transmission channel is busy, that is if another carrier is on the air at the time new data has been loaded into the system, the channel monitor 124 will not provide a signal to the AND gate 120 and the transmission of data will be inhibited as long as the channel remains busy. When the transmission channel becomes clear, the channel monitor 124 provides a signal to the AND gate 120 to allow a data transmission upon receipt of the next pulse from clock 122. The random clock 122 provides a random time delay between the time that the transmission channel becomes clear and the time that the data transmission is initiated. If a random delay were not provided, and if more than one mobile unit were programmed and waiting for the channel to clear, all such units would initiate transmission immediately after the channel became clear and interfere with each other. The use of the random clock 122 causes each unit to initiate transmission at a slightly different time, thereby allowing one unit to transmit before the random clock of another unit causes that unit to transmit. The transmission of the first unit is then detected by the channel monitor 124 to inhibit the transmissions of the other unit until the transmission of the first unit has been completed. The transmissions of the other units then proceeds until each unit has transmitted its message.

The system provides automatic acknowledgment of the transmitted message. After a message has been transmitted by a mobile unit, the message is received by the base station and retransmitted to the mobile unit which receives the retransmitted message and compares it with the last transmitted message stored in the internal and external data sources 110 and 112 which control the programming resistor circuit 108. If the complete message received from the base, including the address, corresponds to the message stored in the data sources 110 and 112, the unit returns to a rest state. If there is no acknowledgment within a predetermined length of time, the transmission initiation circuit 126 applies a signal to the AND gate 120 to cause the message to be retransmitted in the same manner as previously described. The message may be repeated any predetermined number of times (in this embodiment four times), or until the message is acknowledged. If the message is not acknowledged, an indicator light which is energized at the initiation of the transmission remains lighted to alert the operator that the message has not been received. Acknowledgment of the message turns the light off. The reset circuit 128 is connected to the shift register 114 of the decoder (FIG. 5) and to the transmission initiation circuit 126 to reset the initiation circuit 126 upon receipt of an acknowledgement by the decoder.

Figure 5:
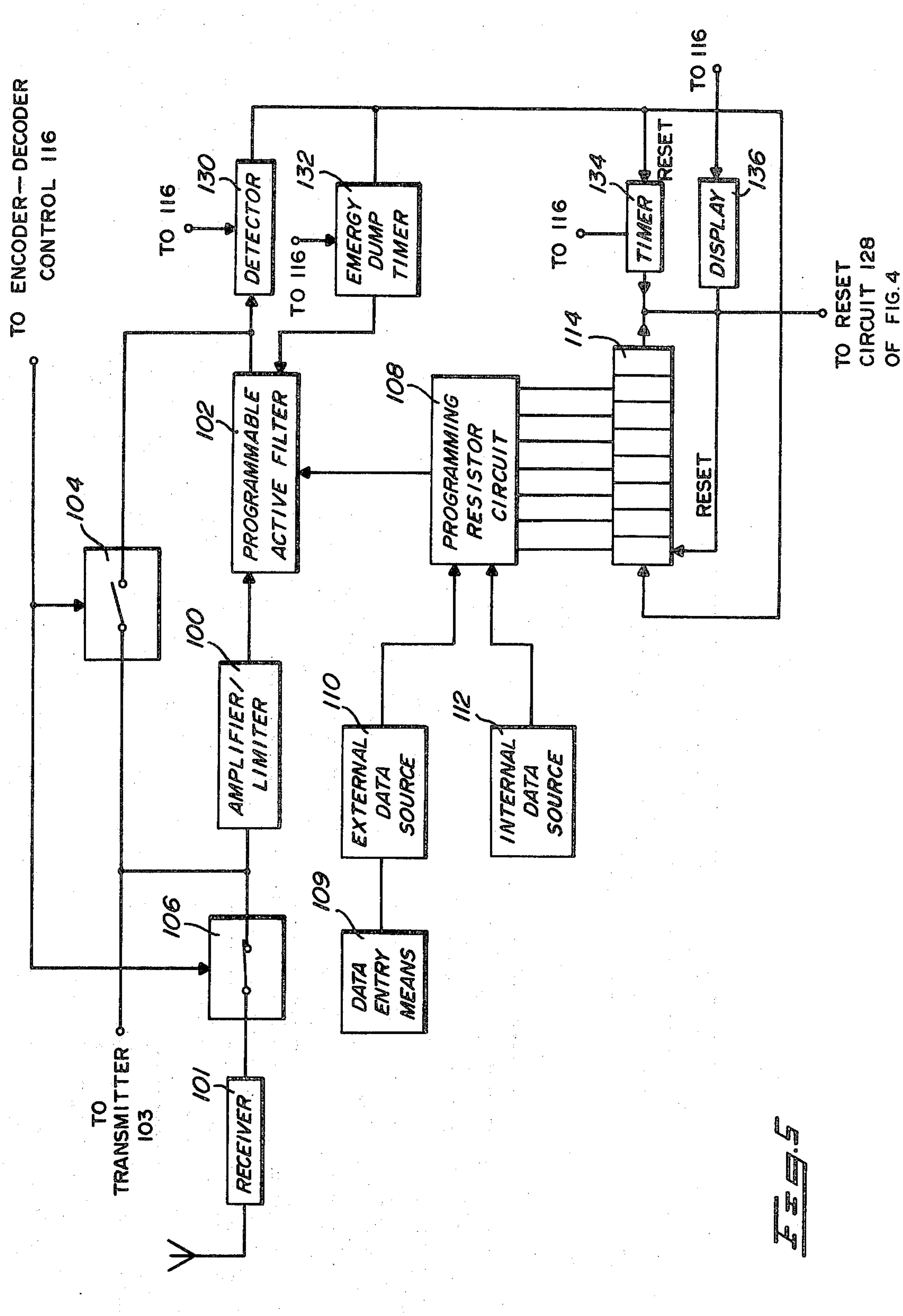
FIG. 5 is a block diagram of the decoding apparatus of a mobile station, and includes functional blocks from the system of FIG. 4 which provide both an encoding and a decoding function.

Referring to FIG. 5, there is shown a block diagram of the mobile station connected to operate as a decoder. Certain functional blocks are utilized in both the encoding and decoding mode, and are shown in FIGS. 4 and 5 having like numbers. In the decoding mode, the amplifier/limiter 100 is connected to the receiver or other source of tone signals through the switch 106, and the switch 104 is open to inhibit oscillation. A detector 130 is connected to the programmable active filter 102 and to the shift register 114. The output of the shift register 114 is connected to a display 136 which may be a visual or audible display as in the case of the base station. An energy dump timer 132 is connected to the detector 130 and the active filter 102, while a reset timer 134 is connected to the detector 130 and the shift register 114. The detector 130, the energy dump timer 132, the timer 134 and the display 136 are connected to the encoder-decoder control 116 for activation thereby when the circuit is operating in the decode mode.

In the decoding mode, tones are applied to the amplifier/limiter 100 through the switch 106 from the receiver or other signal source. The tones are amplified by the amplifier/limiter 100 and applied to the programmable active filter 102. If the received tone frequency is substantially the frequency to which the active filter 102 is tuned, the tone is passed thereby and applied to the detector 130. The detector 130 detects the presence of the tone and provides a signal to the shift register 114 in response thereto to cause the shift register to change the frequency of the filter 102 in accordance with the data programmed in the resistor circuit 108 by the data sources 110 and 112. The message normally programmed into the resistor circuit 108 is a rest state message corresponding to a call to be received by the mobile unit. Simultaneously, the detector applies a signal to the energy dump timer 132 which dissipates the energy stored in the active filter 102 to prevent the detector 130 from falsely responding to residual filter output caused by the energy from the previous tone. If the second tone received from the receiver by the programmable active filter 102 has a frequency equal to the second programmed frequency, the detector 130 generates another signal to cause the shift register 114 to shift the frequency of the active filter 102 to the next programmed frequency. This process is continued until all tones programmed in the resistor matrix 108 have been received in the proper sequence. After all tones of the predetermined message have been received, the shift register 114 provides an output signal to the display 136 to indicate that the pre-programmed message has been received.

The detector 130 also provides a signal to the reset timer 134 upon receipt of a signal from the active filter 102. The reset timer 134 provides a reset signal to the shift register 114 a predetermined time duration following receipt of a signal from the detector 130 unless a subsequent signal is received and applied to the timer 134 before the reset pulse is generated thereby. In this manner, if a portion of the correct tone sequence is received, but the sequence is not completed within a predetermined time duration, the shift register 114 is reset by the timer 134. Because each tone of a proper message sequence has a predetermined time duration, each tone must come within a predetermined time after the previous tone, and signals having a longer time interval between tones are extraneous signals and are not recognized by the system. The function of the reset timer 134 in this embodiment is provided by the clock 118, which operates in a dual mode capacity. Because of the difference in the two modes of operation, however, two separate blocks are shown. If desired, the functions may be provided by separate clocks.

In normal operation, a pre-programmed message, such as, for example, a request for a call is present in the internal data source 112, and the system responds only to that particular message. If a message has just been transmitted by the mobile, that message has been programmed into the resistor circuit 108 by the external data source 110, and the mobile decoder will respond only to the message just transmitted while awaiting acknowledgment from the base station. When the acknowledgment is received, the output signal from the shift register 114 is applied to the reset circuit 128 to inhibit further retransmissions of the message, and the original rest state message is reprogrammed into the resistor circuit 108 by two data sources. If the acknowledgment is not received within a predetermined time duration, the transmitted message is retained in the internal and external data sources 110 and 112 and the unit is automatically switched into the encoding mode for retransmission of the message. After retransmission, the unit reverts to the decoding mode to await acknowledgment. If acknowledgment is still not received, the unit alternates between its encoding and decoding mode to retransmit the message until acknowledgment is received or until the message has been repeated a predetermined number of times, after which time the unit reverts to its decoding mode and the rest state message is programmed into the resistor circuit 108. A light is energized on to the display 136 indicating that the message has not been received.

In cases wherein the rest state message is relatively important, an additional interconnection may be provided between the encode-decode control 116 and the programming resistor circuit 108 to enable the circuit 108 to be programmed with the rest state message following the time duration allotted for acknowledgment, but prior to retransmission of the message. This interconnection (shown dotted) provides a time slot wherein the rest state message may be received even though there has been no acknowledgment of the transmitted message. The dotted interconnection between the encode-decode control 116 and the reset 128 inhibits the operation of the reset 128 during the time interval that the rest state message is programmed into the circuit 108 to prevent the receipt of a rest state message from being interpreted by the system as an acknowledgment.

Although a particular embodiment of a signalling system according to the invention has been illustrated, it should be noted that any tone signalling system providing the functions and features described herein still falls within the scope and spirit of the instant invention.

I claim:

1. A sequential tone signalling system including in combination:

tone signal receiving means;

tone detecting means for providing a pulse signal in response to a tone signal applied thereto;

variable frequency filter means adapted to be connected to said tone signal receiving means and to said tone detecting means for passing predetermined frequency tone signals from said tone signal receiving means to said tone detecting means;

filter program means for storing information representative of a particular sequence of tone frequencies connected to said variable frequency filter means;

pulse responsive switching means connected to said filter program means for changing the frequency of said variable frequency filter means in the particular sequence determined by said filter program means in response to pulses applied to said frequency switching means to select the frequencies of the tone sequence passed by said variable frequency filter means;

data entry means connected to said program means for applying frequency representative information to said filter program means;

feedback means adapted to be connected to said variable frequency filter means, said feedback means and said variable frequency filter means cooperating when connected together to generate oscillations;

pulse producing clock means coupled to said filter frequency switching means; and function selector means connected to said variable frequency filter means having means for selectively connecting said variable frequency filter means to at least one of said tone signal receiving means, said tone detecting means, and said feedback means, said function selector means being switchable to a first encoding and a second decoding mode, wherein said variable frequency filter means is connected to said feedback means in the first encoding mode to generate a variable frequency tone sequence in accordance with the frequency representative information in said program means in response to pulses from said clock means, and wherein said variable frequency filter means is connected to said tone signal receiving means and to said detector means in said second decoding mode to cause said system to respond to a predetermined tone sequence represented by said frequency representative information in said filter program means.

2. A system as recited in claim 1 wherein said filter program means include means for storing first frequency representaive data therein when said function selector is in said second decoding mode, and means for storing second frequency representative data therein when said function selector is in said first encoding mode, said programming means further including means for retaining said second frequency representative data in said filter program means after said function selector means is switched from said first encoding mode to said second decoding mode.

3. A system as recited in claim 2 further including means for reentering said first frequency representative data into said filter program means after said system has responded to the tone sequence represented by said second frequency representative data.

4. A system as recited in claim 3 further including automatic switching means for switching said function selector means from said second decoding mode to said first encoding mode to regenerate said second tone sequence if said system has not responded to said second tone sequence within a predetermined time interval following the generation thereof.

5. A system as recited in claim 4 further including means for reentering said first frequency representative data into said filter program means after said second tone sequence has been regenerated a predetermined number of times.

6. A system as recited in claim 5 wherein said data entry means includes means for altering said second frequency representative data.

7. A system as recited in claim 6 wherein said altering means includes a pushbutton.

8. A system as recited in claim 6 wherein said altering means includes means for automatically altering said second frequency representative data.

9. A system as recited in claim 8 wherein said automatic altering means includes a status sensor means.

10. A system as recited in claim 9 wherein said status sensor means includes means for altering said second frequency representative data only when there is a change in status.

11. A system as recited in claim 6 wherein said automatic switching means includes means for maintaining said function selector means in said second decoding mode, and further includes means for automatically switching said system to said first encoding mode to generate said second tone sequence when said second frequency representative data is altered.

12. A system as recited in claim 1 further including discharge means connected to said variable frequency filter means for discharging the energy therein between changes in frequency thereof.

13. A system as recited in claim 1 further including signal monitoring means connected to said tone signal receiving means for providing clear signals in response to an absence of signals received by said receiving means, random clock means for generating pulses, and inhibiting means connected to said signal monitoring means and to said random clock means for inhibiting the generation of the variable frequency tone sequence unless both the clear signal and a pulse from said clock are applied thereto.

14. A sequential tone signalling system including in combination:

a first station for receiving and transmitting sequential tone signals, said first station including first signal receiving means, a plurality of filters connected to said first signal receiving means for passing predetermined frequency tone signals from said receiving means therethrough, detecting means connected to each of said filters for receiving and detecting the predetermined frequency tone signals, decoding means connected to said detecting means and responsive thereto to provide a decoded signal representative of a predetermined received tone sequence, storage means connected to said decoding means for receiving and storing said decoded signal, programming means connected to said storage means for applying a predetermined coded signal representative of a tone sequence thereto, tone generating means coupled to said storage means and responsive thereto for generating a tone sequence in response to signals therefrom, and switching means connected to said storage means for causing said tone generating means to generate a tone sequence representative of one of said decoded and coded signals; and a second station for receiving and transmitting sequential tone signals, said second station including second signal receiving means, variable frequency filter means switchably connected to said second signal receiving means for passing a predetermined frequency tone signal therethrough, detecting means connected to said variable frequency filter means for receiving and detecting tone signals, filter program means, filter frequency switching means coupled to said filter means, said filter program means, and said detector means for varying the frequency of said filter means in a sequence determined by said filter program means in response to signals from said detecting means, tone generating means for providing tone signals switchably connected to said variable frequency filter means for varying the frequency of the tone signals from said tone generating means in response to the frequency of said variable filter means, data entry means connected to said filter program means for causing said filter program means to vary the frequency sequence of said variable filter means, and means for connecting said variable frequency filter means to said second signal receiving means for receiving a predetermined tone sequence determined by said filter program means, and to said tone generating means for causing said tone generating means to generate a tone sequence in response to said filter program means.

15. A signalling system as recited in claim 14 wherein said first station further includes means for automatically regenerating tone sequences received thereby.

16. A signalling system as recited in claim 15 wherein said second station further includes means for automatically regenerating a particular tone sequence initially generated thereby if a sequence substantially the same as the particular sequence is not received by said second station within a predetermined time interval following the generation thereof.

17. A signalling system as recited in claim 16 wherein said second station further includes means for inhibiting the generation of a tone sequence when any signal is being received by said second signal receiving means.

18. A signalling system as recited in claim 17 wherein said second station further includes means for enabling the generation of a tone sequence after a random time interval within a predetermined range of time intervals following the termination of a signal received by said second signal receiving means.

19. A sequential tone signalling system including in combination:

means for generating a predetermined group of tones representative of a plurality of information digits;

means for generating a separation tone different from the information digit representative tones;

means for transmitting the tones generated by said generating means;

control means connected to said generating means and said transmitting means and cooperating therewith for causing said transmitting means to sequentially transmit an initial tone selected from the group of information digit representative tones, a first plurality of tones representative of a predetermined message selected from the group of information digit representative tones, wherein each tone is further selected to be different than the tones immediately preceding and following it, the separation tone, and a second plurality of tones selected from the group of information digit representative tones, wherein each tone is further selected to be different than the tone immediately preceding it.

20. A system as recited in claim 19 including means for transmitting said separation tone after one of said information digit representative tones to indicate a repeat of the information digit represented thereby.

21. A system as recited in claim 20 wherein said control means includes means for providing a seven tone sequence.

22. A system as recited in claim 19 further including means for receiving tone sequences, wherein said receiving means includes means responsive to the information digits represented by the tone sequences.

23. The method of transferring a sequential tone signal from a first station to a second station comprising the steps of:

transmitting a system tone having a predetermined frequency and time duration from said first station for receipt by said second station responsive to tones having said predetermined frequency to enable said second station to receive subsequently transmitted tones;

transmitting a plurality of tones representative of a predetermined message from said first station, wherein each tone has a fixed time duration and a frequency equal to one of several predetermined frequencies, and wherein each tone has a frequency different than the frequency of the tone immediately preceding it;

transmitting a separation tone having a frequency different than the frequency of any preceding tone; and transmitting a plurality of identification tones representative of digits for identifying one of said stations, wherein no two successive identifying tones have the same frequency, and wherein said separation tone is transmitted to indicate that a digit is to be repeated.

24. The method recited in claim 23 further comprising the steps of:

receiving at said second station the sequential tone signal transmitted by said first station;

re-transmitting said sequential tone signal from said second station to said first station for receipt thereby;

applying the tones of the sequential tone signal received by said first station to an input terminal of a variable frequency bandpass filter tuned to pass signals having a frequency equal to the frequency of the first tone in said sequence to an output terminal thereof;

detecting the presence of the first tone at the output terminal of the bandpass filter;

adjusting the variable frequency bandpass filter to pass signals having a frequency equal to the frequency of the second tone in said sequence upon detection of the first tone;

detecting the presence of the second tone at the output of the bandpass filter;

readjusting the variable frequency bandpass filter after each detection to pass signals having a frequency equal to the frequency of the tone sequentially following the last detected tone until the last tone of the sequence has been detected; and providing a signal indicative of the detection of the last tone.

25. The method recited in claim 24 further including the step of re-transmitting said sequential tone signal from said first station when said sequential tone signal is not received thereby within a predetermined time interval following transmission of said sequential tone signal by said first station.

* * * * *